United States Patent [19]
Kramer et al.

[11] Patent Number: 5,422,939
[45] Date of Patent: Jun. 6, 1995

[54] PARALLEL OFF-HOOK DETECTION FOR BOTH LINE-AVAILABLE AND PHONE PICK-UP DETECTION

[75] Inventors: Richard A. Kramer, Sugar Hill; Scott C. Swanson, Roswell, both of Ga.

[73] Assignee: Schlumberger Industries, Inc., Norcross, Ga.

[21] Appl. No.: 102,325

[22] Filed: Aug. 5, 1993

[51] Int. Cl.⁶ .................... H04M 11/00; H04M 1/00
[52] U.S. Cl. .................................. 379/107; 379/106; 379/93; 379/377
[58] Field of Search ................ 379/93, 94, 96, 97, 379/98, 100, 161, 184, 377, 383, 387, 106, 107

[56] References Cited

U.S. PATENT DOCUMENTS

| | | | |
|---|---|---|---|
| 4,224,478 | 9/1980 | Fahey et al. | 379/93 |
| 4,825,465 | 4/1989 | Ryan | 379/100 |
| 4,833,618 | 5/1989 | Verma et al. | 379/107 |
| 4,958,371 | 9/1990 | Damoci et al. | 379/107 |
| 5,140,631 | 8/1992 | Stahl | 379/377 |

*Primary Examiner*—Curtis Kuntz
*Assistant Examiner*—Jason Chan
*Attorney, Agent, or Firm*—Sanford J. Asman

[57] ABSTRACT

A secondary communications device, such as a modem, a facsimile machine, an automatic meter reader or an answering machine, shares a telephone line with a subscriber's telephone and must grant the telephone primary access to the line. The present invention prevents the secondary device from seizing the line when the telephone is already off-hook and will terminate a line seizure by the secondary device if the subscriber picks up the telephone handset during use of the line by the secondary device. An average interval for charging a capacitor to a threshold voltage in response to an on-hook voltage appearing across the telephone line is determined. When the secondary communications device is ready to use the line, circuitry measures an interval for charging the capacitor in response to the current voltage appearing across the telephone line. The secondary communication device seizes the line only if the measured interval does not exceed the average interval by more than a predetermined amount. After seizure by the secondary communication device, a steady-state condition is brought about between the secondary device, the line steady-state impedance, and the central office voltage source. If the line impedance drops from the steady-state value, the circuitry assumes that the subscriber has taken the telephone off-hook and terminates the line seizure by the secondary device.

15 Claims, 12 Drawing Sheets

PARALLEL OFF-HOOK DETECTION FOR BOTH LINE-AVAILABLE AND PHONE PICK-UP DETECTION

TECHNICAL FIELD

The present invention relates to a device for detecting the status of a telephone line so that communication equipment sharing the line with a telephone will not interfere with normal usage of the telephone via the line.

BACKGROUND OF THE DISCLOSURE

Many automated devices, such as answering machines, facsimile machines, modems and the like, share a standard telephone line with a subscriber's telephone set. Generally, priority should be given to use of the line by the telephone set. Problems have arisen, however, in detecting a subscriber's attempts to access the line through the telephone set. For purposes of discussion we will consider a data reporting device as one such automated system which shares a telephone line with a subscriber's telephone set.

An automated data reporting device transmits utility meter data or similar data from a subscriber's premises to a central computer database and/or receives programming and control data from the central computer. Such devices eliminate the manual labor required to go out to the subscriber's premises and read or program the meter.

Many such data reporting systems use the subscriber's telephone line and the public switched telephone network to carry the data between the subscriber's premises and the central database. For example, the data reporting device might include an autodialing modem and periodically initiate a call in to the central database to transfer the latest meter data. Some of these systems can answer calls from the central database and accept programming or control data. Data reporting devices which use the subscriber line, however, share the line with the subscriber's telephone(s) and/or any other customer premises equipment connected to the line.

In such telephone line systems, the subscriber's telephone or other equipment is the primary communication device connected to the line and must be given priority over the secondary communication device, e.g. the data reporting device. Operation of the data reporting device or other automated device connected to share the line therefore must not interfere with the subscriber's use of the telephone set on the telephone line. To prevent interference, two problems must be addressed. First, the automated device must not attempt to seize the line if the telephone is using the line at a time when the automated device is ready to access the line, e.g., to report data. Second, during use of the line by the automated device, if the subscriber picks up the telephone handset to use the telephone, the automated device must relinquish the line to the telephone.

Circuits have been proposed which detect an existing off-hook condition, and devices have been proposed to detect a pick-up of a telephone connected in parallel with the data reporting device. Such circuits, however, have tended to be rather complex, particularly if capable of both existing line use detection and pick-up detection. Due to such complexity, these circuits have been expensive to manufacture and subject to false detection results.

Detection of a pick-up of a telephone connected in parallel with the data reporting device or the like can be particularly difficult because the resultant voltage drop tends to be quite small. As a result, devices intended to detect parallel pick-up often have been ineffective.

A circuit has been proposed which would detect parallel pick-up by sensing changes in AC loading on the telephone line (U.S. Pat. No. 4,958,371 to Damoci et al). The approach in that patent, however, requires generation and application of a 300 Hz test signal to the line.

Another problem with prior art systems arises because many such systems detect line voltage directly, as an indication of the on-hook or off-hook state of the associated customer premises equipment. Different lines, however, exhibit different off-hook and on-hook voltages. For example, a residential line will typically have an on-hook voltage of 48 volts DC. The off-hook voltage typically will be as low as 3 volts DC, but the off-hook voltage may be as high as 26 volts DC. In contrast, the on-hook voltage for a PBX line typically is 22–26 volts DC. In view of this voltage overlap between off-hook of residential lines and on-hook for PBX line, it is necessary to use a different voltage detector for each different type of line.

DISCLOSURE OF THE INVENTION

The present invention provides efficient and effective means for solving the above noted problems of sharing the use of the subscriber's telephone line between the subscriber's primary telephone equipment and some secondary communication device, without applying any additional signals to the line.

The invention provides method and apparatus for detecting whether or not the primary telephone equipment is off-hook. This detection can be used to prevent or inhibit the secondary device from seizing the line if the primary communication device is off-hook.

The invention also detects parallel pick-up, e.g. of the telephone handset, during a period when the secondary device is already using the line. This detection can be used to control the secondary device to terminate its use of the line and thereby make the line available for use by the primary telephone device.

As part of the line availability detection, an average interval for charging a capacitor to a threshold in response to an on-hook voltage appearing across the telephone line is determined and periodically updated. Typically, the average is determined by periodically applying the line voltage to charge the capacitor. During each periodic sampling, the time to charge the capacitor is measured and the time is recorded as a sample interval. The current sample interval and a previously stored average interval are averaged together, and the new average value is stored. Subsequently, at a time when the secondary communication device is ready to use the line, the time interval for charging the capacitor in response to the voltage appearing across the telephone is measured. If the secondary communication device determines that the measured time interval exceeds the stored average interval by more than a predetermined amount, the secondary device recognizes that the telephone or other primary customer premises equipment is off-hook. The secondary device seizes the line only if the measured interval does not exceed the average interval by more than the predetermined amount. The periodic averaging of the charging interval allows the detector to learn the typical on-hook voltage for the particular line on which the detector is installed. The interval averaging and comparison process thereby eliminates the need for a voltage detector selected or designed to operate solely on the particular type of line on which the detector is installed. This approach allows one line state detector circuit to operate on different types of lines exhibiting different voltages, including PBX lines and residential lines.

During line seizure by the secondary communication device, a steady-state condition is brought about between the secondary device, the line steady-state impedance, and the central office voltage source. If the line impedance drops from the steady-state value, the detector assumes that the subscriber has taken the telephone off-hook or that other primary customer premises equipment has gone off-hook, and the line seizure by the secondary communication device is terminated.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
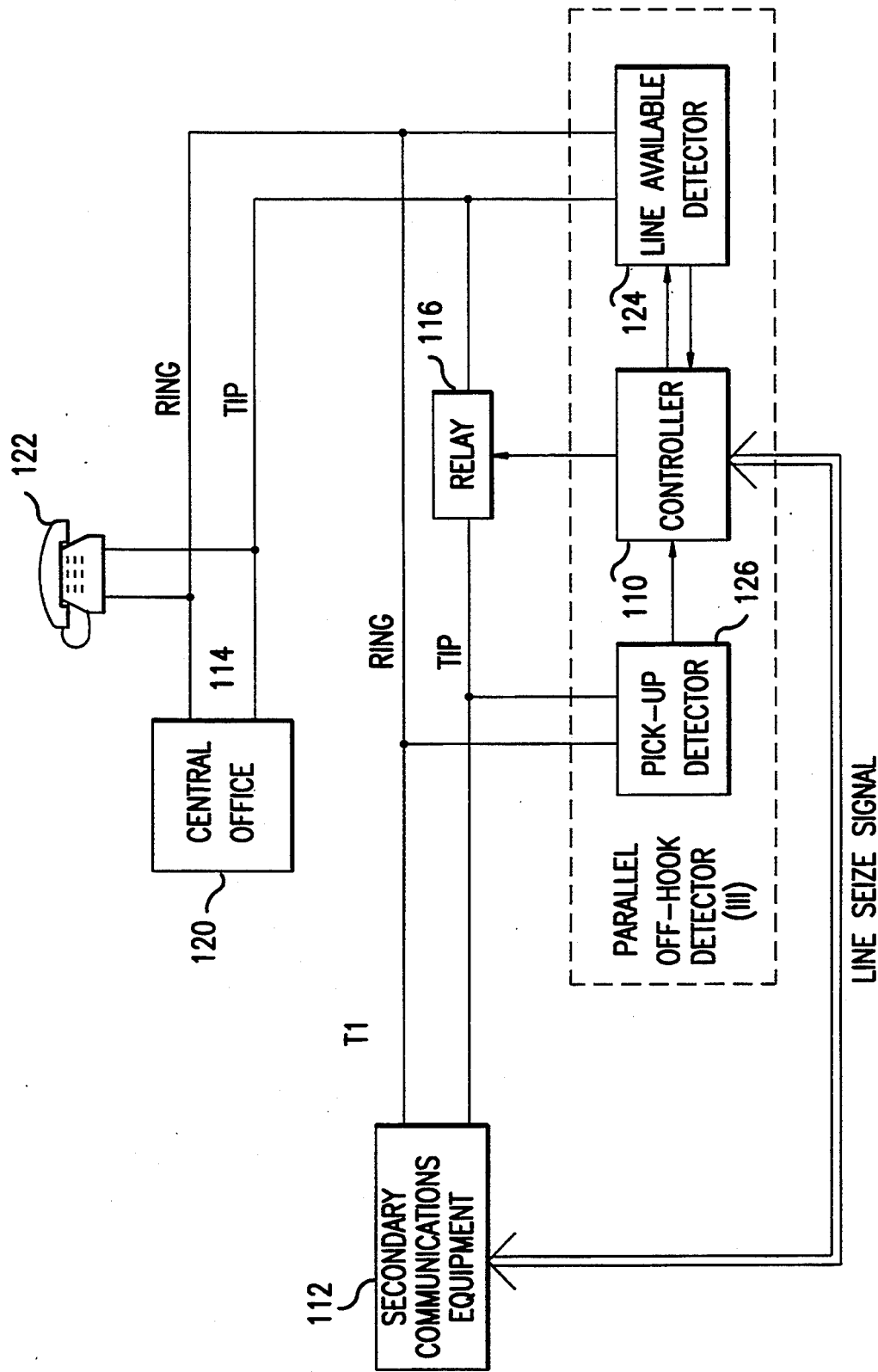
FIG. 1 is a simplified block diagram of an automated communication device, incorporating the parallel off-hook detector of the present invention.

FIG. 1 illustrates a generic embodiment of the present invention. In this embodiment, the primary communications equipment includes at least a standard telephone set 122. The telephone 122 shares the telephone line 114 to central office 120 with some form of secondary communications equipment 112. Although the primary communications equipment is shown as a telephone set 122, the primary communications equipment can be any telephone line compatible device which is to have priority over the secondary equipment 112 for purposes of using the telephone line 114. Similarly, the secondary communications equipment can take a variety of forms, such as a voice answering machine, a facsimile machine, a PC with a modem, a meter reader, etc., which are to have lower priority. For example, if the secondary device were an answering machine, the primary device typically would be a telephone set. In another example, if the secondary device reports meter data or the like, the primary equipment may include both the telephone 122 and any other customer premises equipment, such as a voice answering machine, a facsimile machine, a PC with a modem, etc., which has priority over the data reporting device.

The secondary communications equipment 112 connects to the subscriber premises end of telephone line 114 through a coupling transformer T1 and a line seizure relay 116. The parallel off-hook detection device 111 shown in FIG. 1 includes a programmable microprocessor based controller 110, a Line Available Detector 124 and a Pick-up Detector 126. The controller 110 connects to secondary communications equipment 112 to exchange information relating to line seizure. The controller 110 also connects to the relay 116 to control operation thereof for opening and closing the telephone loop.

The line seizure relay 116 provides selective connection to one of the leads of telephone line 114. The primary of the coupling transformer T1 is connected to the relay 116 and the other lead of the telephone line 114. As illustrated in FIG. 1, the line seizure relay 116 connects between the TIP lead and one lead of the primary of the transformer T1. The other lead of the primary of the transformer T1 connects to the RING lead. Closure of the line seizure relay 116 permits current flow through the primary of the coupling transformer T1 and thereby creates an off-hook condition.

The Line Available Detector 124 and the Pick-up Detector 126 each connect to both the TIP and RING leads of the telephone line 114, but in a slightly different manner. In this embodiment, the Line Available Detector 124 and the Pick-up Detector 126 both connect to the RING lead. The Line Available Detector 124 connects to the TIP lead at a point on the Central Office side of the line seizure relay 116, and the Pick-up Detector 126 connects to the TIP lead on the same side of the relay as the coupling transformer T1.

At a time when the secondary communications equipment 112 has not yet accessed or seized the line by closure of the relay 116, if the associated subscriber's telephone 122 is on-hook, the loop of telephone line 114 is open. The entire central office loop voltage appears across the TIP and RING of the subscriber's line, referred to as the on-hook voltage. If the subscriber's telephone 122 is off-hook, however, the telephone would appear as a 600 Ohm impedance across the line closing the loop through the TIP and RING pair of the telephone line. The line voltage would be substantially lower.

To seize the line, the secondary communications equipment provides a line seize signal to the controller 110. The controller applies an activation signal to the Line Available Detector 124, in response to which the Detector 124 provides signals which the controller 110 can interpret to determine if the telephone 122 is off-hook or if the line 114 is available so that the secondary communications equipment can use the line 114. If the telephone 122 is off-hook, the controller 110 waits for some predetermined period and repeats the line available checking procedure. When the line 114 becomes available for use by the secondary equipment, the controller 110 activates relay 116 to seize the line and provides appropriate signals to the secondary communications equipment 112 informing it that the line is now ready for use.

At a time when the secondary communications equipment 112 is using the line 114, the line seizure relay 116 is in a closed state, and the impedance of the coupling transformer T1 appears across the telephone line. If a primary piece of subscriber premises equipment, such as telephone 122, attempts to use the line at such a time, for example because the subscriber lifts the handset of telephone set 122 off-hook, the impedance of the primary equipment would appear across the line in parallel with that of the transformer T1 and associated secondary communications equipment 112. The Pick-up Detector 126 senses a sudden drop in impedance, and provides a signal to the controller 110 indicating the drop in impedance.

In response to the indication signal from the Pick-up Detector 126 signifying that primary equipment has attempted to seize the line 114, the controller 110 deactivates relay 116 and interrupts communications by equipment 112. The subscriber picking up the handset 122 will hear silence on the line. A fairly natural reaction of a subscriber who hears silence instead of the expected dial tone is to hang up briefly and try again or to actuate the hookswitch briefly one or more times and wait to see if dial tone appears. In either case, the telephone network central office 120 senses an interruption of line current indicating the end of the existing call connection followed by a new off-hook state. In response, the central office 120 will apply a dial tone to the telephone line 114. The subscriber can then dial out to place a call in the normal manner.

Figure 2:
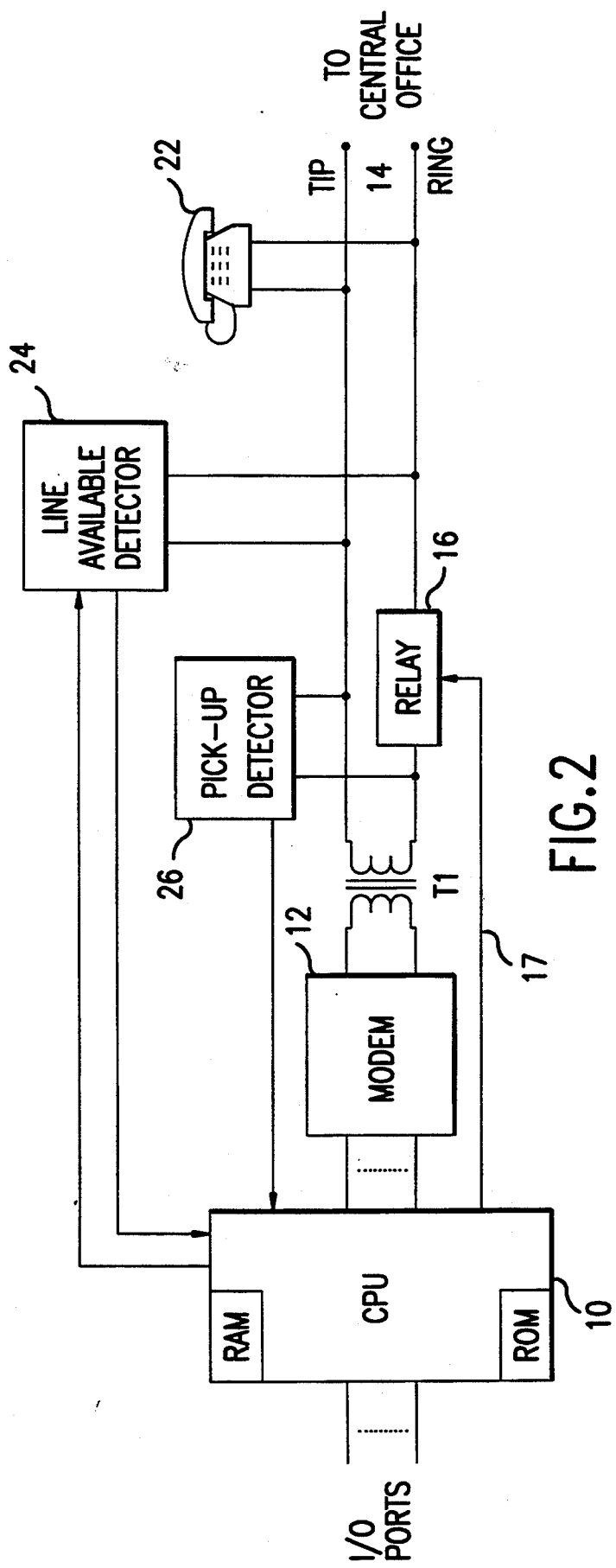
FIG. 2 is a simplified block diagram of a preferred embodiment of the present invention, wherein the parallel off-hook detector is incorporated into a data reporting device such as might be used for automated reading of a utility meter.

FIG. 2 depicts a preferred embodiment of the present invention, wherein the parallel off-hook detector is incorporated into a data reporting device for automated reading of a utility meter.

The secondary communication device in this embodiment includes a programmable microprocessor based controller 10, which includes a central processing unit (CPU), random access memory (RAM), read only memory (ROM) etc. The Input/Output (I/O) ports of the controller 10 send and receive digital signals to and from an associated digital device. For example, in an electricity metering and control system, the Input/Output (I/O) ports of the controller 10 connect to a programmable meter/reader and control device (not shown) for two-way transfer of information. The controller 10 performs the function of controller 110 in the first embodiment and performs certain data processing and control functions of the secondary equipment 112.

A modem 12 connects to the subscriber premises end of telephone line 14 through a coupling transformer T1 and a line seizure relay 16. Although illustrated as separate components for convenience, the line seizure relay 16 and coupling transformer T1 may be components of the modem. The controller 10 connects to the modem 12 via a standard serial interface for transmission and reception of data via the telephone line 14. The controller 10 also connects to the relay 16 via line 17, to control operation thereof for opening and closing the telephone loop by connecting the primary of transformer T1 across telephone line 14. One or more pieces of primary subscriber premises telephone equipment, such as a telephone set 22, connect to the subscriber premises end of telephone line 14 in parallel with the data reporting device. The primary device may include any customer premises equipment, such as a voice answering machine, a facsimile machine, a PC with a modem, etc. which is to be given higher priority for accessing the line than the particular type of secondary equipment, in this specific case a utility meter data reporting device.

Figure 3:
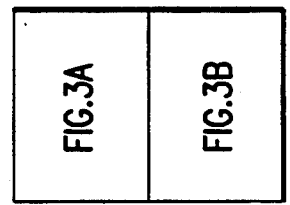
FIGS. 3A and 3B are a detailed circuit diagram depicting the parallel off-hook detector of the present invention together with the transformer and the line seizure relay which may be connected to the subscriber's telephone line in the embodiment of FIG. 2.

In this embodiment, the line seizure relay 16 connects between the RING lead of telephone line 14 and one lead of the primary of the transformer T1. The other primary lead of the transformer T1 connects directly to the TIP lead. Closure of the line seizure relay 16 permits current flow through the 600 Ohm secondary impedance of the coupling transformer T1 and thereby creates an off-hook condition (see also FIG. 3).

The meter reading device of FIG. 2 also incorporates a Line Available Detector 24 and a Pick-up Detector 26. The Line Available Detector 24 and the Pick-up Detector 26 both connect to the TIP lead. The Line Available Detector 24 connects to the RING lead at a point on the Central Office side of the line seizure relay 16, and the Pick-up Detector 26 connects to the RING lead on the same side of the relay as the primary of coupling transformer T1.

At a time when the data reporting device has not yet accessed or seized the line by closure of the relay 16, if the associated subscriber's telephone 22 is on-hook, the telephone loop is open. The entire central office loop voltage (typically a 24–48 volts DC battery voltage) would appear across the TIP and RING of the subscriber's line, referred to as the on-hook voltage. If the subscriber's telephone is off-hook, however, the telephone would appear as a 600 Ohm impedance across the line closing the loop through the TIP and RING pair of the telephone line (see also FIG. 3). The line voltage would be substantially lower.

The Line Available Detector 24 responds to an activation signal from the controller 10 and provides signals which the controller 10 can interpret to determine if the telephone 22 is off-hook or if the line 14 is available so that the data reporting device can call the central computer, in a manner to be explained in more detail below.

If the telephone 22 is off-hook, the line is not available for use by the data reporting device. Therefore, the controller 10 waits for some predetermined period and repeats the line available checking procedure. The controller repeats this processing loop until it determines that the telephone line 14 is available. When the line becomes available, the controller 10 activates relay 16 to seize the line and provides appropriate signals to the modem 12 instructing it to send dual tone multifrequency (DTMF) dialing signals to initiate a call to the central computer. Alternatively, the controller 10 could intermittently activate the relay 16 to simulate pulse dialing. When the call reaches the central computer, the controller 10 executes appropriate procedures for reporting current meter reading data to the central computer and receives back any necessary instructions or control data from the central computer.

At a time when the data reporting device is using the line, the line seizure relay 16 is in a closed state, and the 600 Ohm impedance of the coupling transformer T1 appears across the telephone line. The subscriber's customer premises equipment, however, is on-hook and appears as a very large impedance across the line. If a piece of subscriber premises equipment attempts to use the line at such a time, for example because the subscriber lifts the handset of telephone set 22 off-hook, a second 600 Ohm impedance would appear across the line in parallel with that of the meter data reporting device (see also FIGS. 3A and 3B). The Pick-up Detector 26 senses a sudden drop in impedance, i.e. the change from a very high parallel impedance to the 600 Ohm parallel impedance, and provides a signal to the controller 10 indicating the drop in impedance.

In response to the indication signal from the Pick-up Detector 26 signifying that other equipment has attempted to seize the line, the controller 10 deactivates relay 16 and interrupts modem transmissions. This results in loss of carrier at the central office computer, and therefore the modem at the central office computer assumes that the data reporting device has hung up. In response, the modem at the central computer will terminate its connection to its telephone line, and the subscriber picking up the handset will hear silence on the line. A fairly natural reaction of a subscriber who hears silence instead of the expected dial tone is to hang up briefly and try again or to actuate the hookswitch briefly one or more times and wait to see if dial tone appears. In either case, the telephone network central office sees an interruption of line current indicating the end of the existing call connection followed by a new off-hook state. In response, the central office will apply a dial tone to the telephone line 14. The subscriber can then dial out to place a call in the normal manner.

After the interruption of the data reporting call, the controller 10 will periodically activate the Line Available Detector 24 to check the line status. When the line becomes available again, the controller 10 can proceed with a new data reporting call to the central computer, as discussed above.

LINE AVAILABLE DETECTION

Figure 3A:
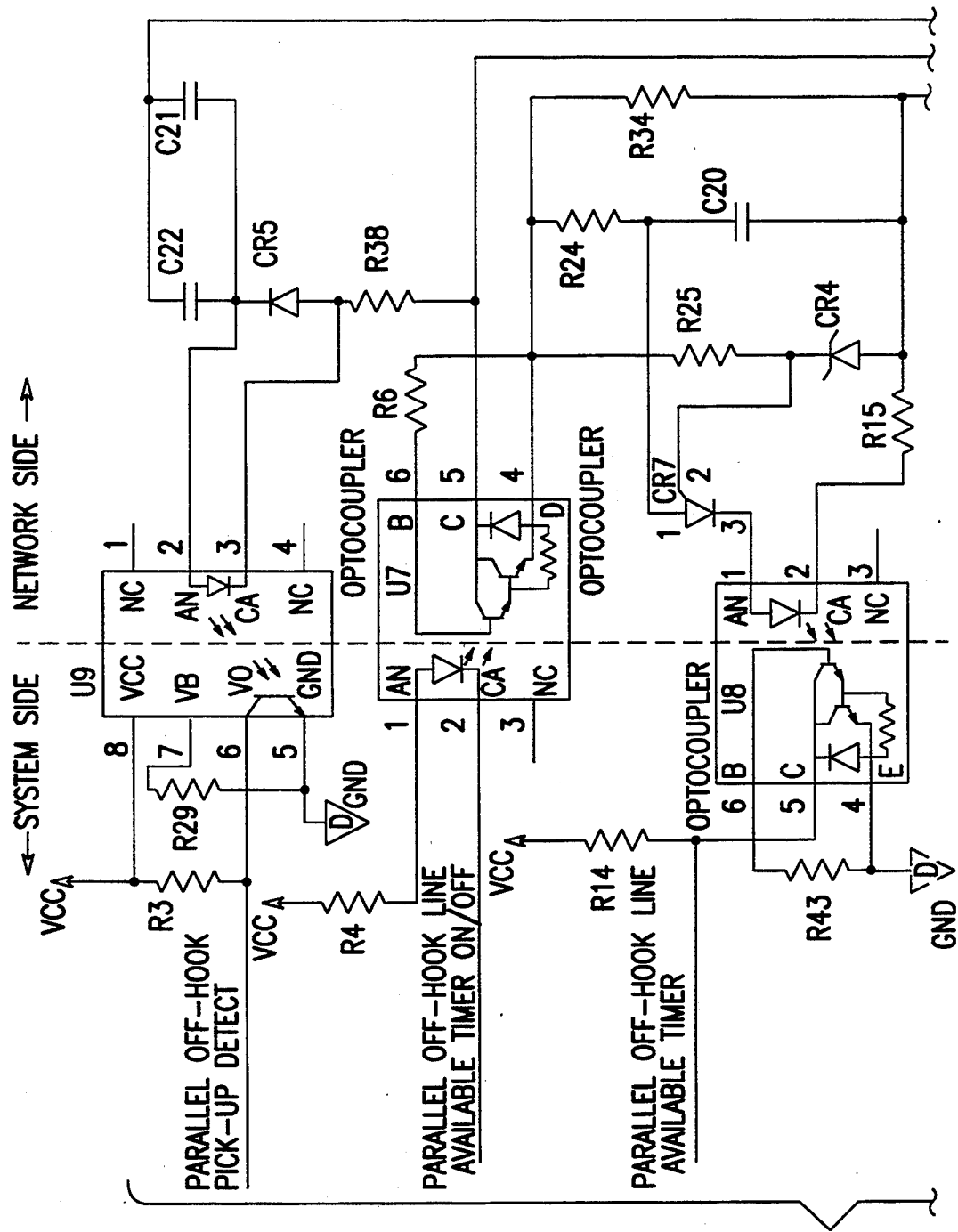
Figure 3B:
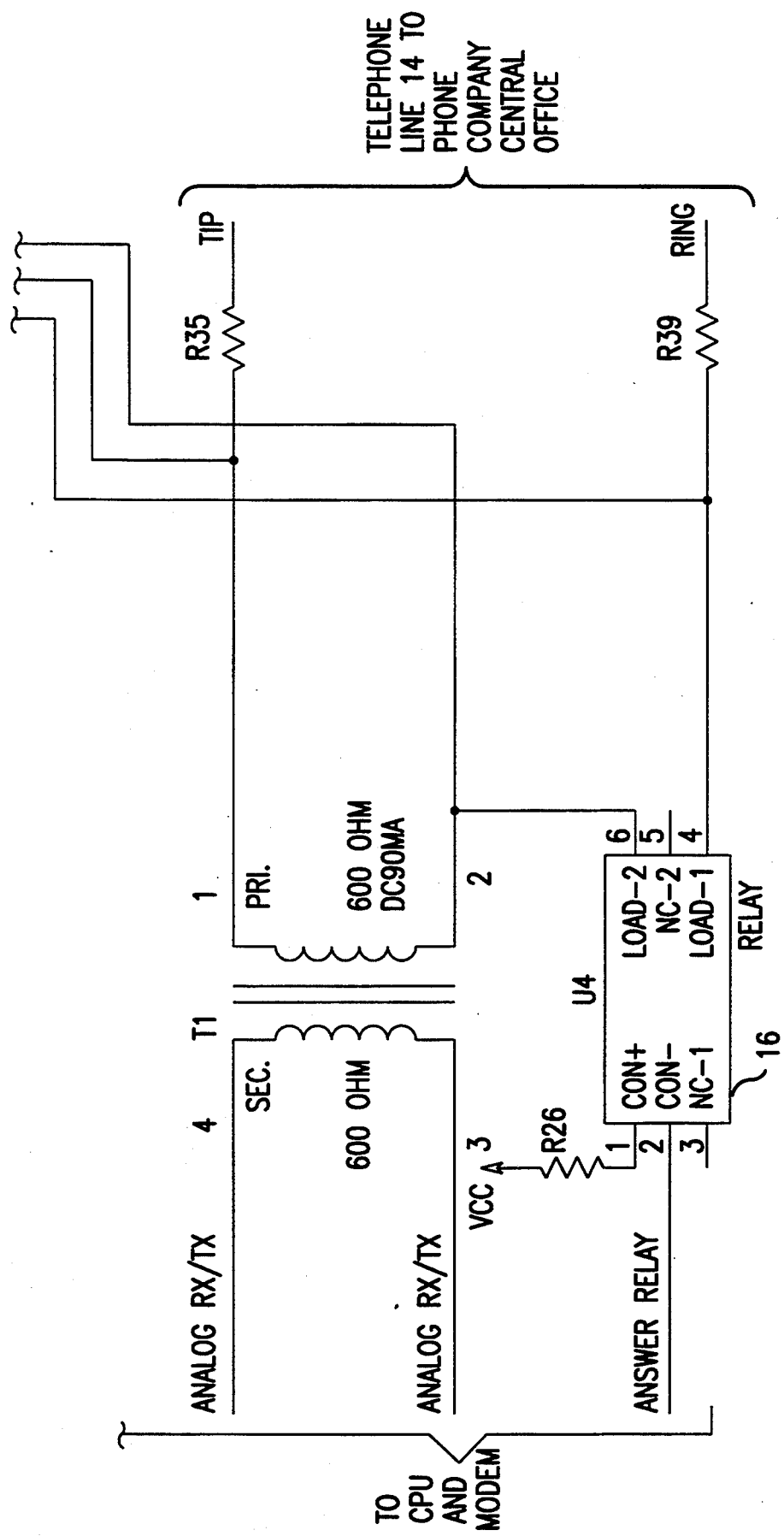

The present invention determines line availability based on the voltage appearing across the telephone line. This voltage is sensed by measuring the time required to charge a capacitor. With reference now to FIGS. 3A and 3B, the Line Available Detector 24 comprises the circuit components U7, U8, C20, R4, R6, R14, R15, R24, R25, R34, R43, CR4, and CR7.

To sense line voltage, the CPU of the controller 10 will gate the opto-coupler U7 on to allow sampling of the telephone line voltage. Specifically, the CPU will apply an activating voltage to the light emitting diode of opto-coupler U7. This activates the transistor of opto-coupler U7 and applies the voltage between the TIP and RING leads across the RC circuit formed by resistors R24, R25, and R34 and capacitor C20. The line voltage will charge the capacitor C20.

The Programmable Unijunction Transistor (PUT) CR7 will trigger when the voltage applied thereto passes a threshold value thereof established by resistor R25 and zener diode CR4. Thus, when the voltage on capacitor C20 exceeds the threshold of the PUT CR7, the PUT CR7 turns on momentarily and discharges the voltage from the capacitor C20 through the light emitting diode of the opto-coupler U8. This activates the transistor of opto-coupler U8 causing a pulse output to the CPU.

If the voltage across the TIP and RING is high, the current flowing through the RC circuit will be higher than when the voltage across the TIP and RING is low. As a result, the rate of charging will vary as a function of the voltage across the line. Different charging rates will result in different periods of time between the start of charging by gating opto-coupler U7 on and the pulse output by opto-coupler U8 indicating that the capacitor voltage exceeds the threshold. It has been found that the time difference (charging interval) between gating opto-coupler U7 on and the pulse output from opto-coupler U8 is exponentially related to the DC voltage across the TIP and RING pair of the line. For example, if the line voltage is approximately 48 volts DC, the average charging interval will be around 60 $\mu$s; if the line voltage is approximately 22 volts DC, the average charging interval will be around 100 $\mu$s; if the line voltage is approximately 15 volts DC, the average charging interval will be around 140 $\mu$s; and if the line voltage is approximately 14 volts DC, the average charging interval will be around 166 $\mu$s. Therefore, the charging time can be measured as an indication of line voltage.

When the subscriber's telephone is on-hook, a high voltage appears across the telephone line, referred to as the on-hook voltage, and the capacitor C20 will charge relatively quickly. The capacitor voltage will exceed the threshold shortly after the CPU gates the opto-coupler U7 on. When subscriber's telephone is off-hook, a low voltage appears across the telephone line, and the capacitor C20 charges at a slower rate. It therefore will take longer for the voltage on the capacitor C20 to reach the threshold value and trigger the PUT C27 and opto-coupler U8. The present invention detects this timing difference to determine whether the associated telephone is on-hook or off-hook.

In the present invention, the CPU learns a typical average charging interval and assumes that the telephone set is off-hook if a measured charging interval exceeds the typical charging interval by more than a predetermined amount. Specifically, the CPU periodically (e.g. every thirty minutes) gates the opto-coupler U7 on and measures the time between the pulse it applied to the opto-coupler U7 and the output pulse received from the opto-coupler U8. After each sample interval measurement, the CPU averages the current sampled interval with the previously stored average value. Specifically, the CPU adds the current sample to the average and divides by 2. The CPU stores this latest average in RAM as a new representation of the "typical" on-hook time.

Figure 5:
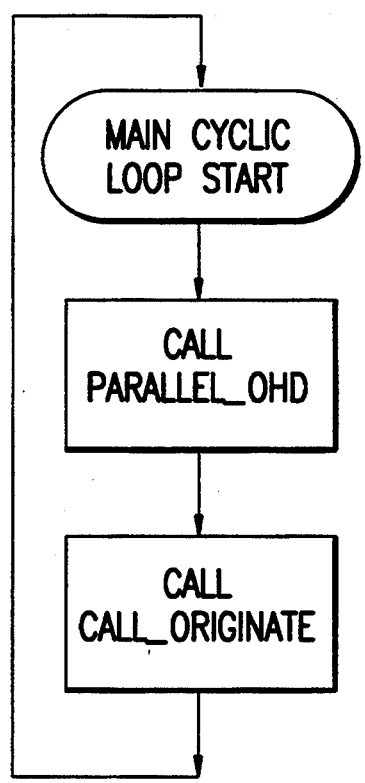
FIGS. 5, 6, 7A, 7B and 8–10 are flow charts illustrating various processing operations performed in accord with the line availability determination of the present invention.

When it is desired for the meter to make a call to the central computer to report reading data, the CPU must first determine if the subscriber's telephone is currently in use. FIG. 5 depicts this main processing routine. When the main cyclic loop of the CPU indicates a time to report data, the CPU calls a parallel off-hook detection (PARALLEL_OHD) routine. When the parallel off-hook detection routine indicates that the line is available, the CPU calls up its call origination routine (CALL_ORIGINATE) routine to seize the line and instruct the modem to autodial the central computer. To determine if the line is available, the CPU executes a sampling of the line voltage as discussed above, and measures the current time between the pulse applied to gate the opto-coupler U7 on and the output pulse received from the opto-coupler U8. This current sampled time measurement is compared against the average or "typical" on-hook time which the CPU stored in RAM. If the current sampled time measurement exceeds the "typical" on-hook time by a predetermined amount, the time sample indicates that the TIP and RING line voltage decreased a substantial amount representative of an off-hook state.

In the preferred embodiment, the predetermined amount is 40 μs. For example, assume that the telephone line is a residential line. The on-hook voltage will be approximately 48 volts DC, and the average charging interval will be around 60 μs. The 40 μs increase in charging interval corresponds to a line voltage drop of 26 volts DC, and the interval threshold (average plus the predetermined amount) will be 100 μs. Thus, if the charging interval at the time when the data reporting device is ready to use the line is greater than 100 μs, the line voltage has dropped 26 volts or more (i.e. to a value less than 22 volts). For example, if the line voltage is approximately 14 volts DC, the measured interval will be 166 μs, which is greater than the 100 μs threshold, and indicates that the telephone set 22 is off-hook.

As a second example, assume telephone line 14 is a PBX line. In this case, the on-hook voltage is approximately 22 volts DC, and the average charging interval will be around 100 μs. The 40 μs change corresponds to a line voltage drop of around 7 volts DC, e.g., from 22 volts DC to 15 volts DC. The interval threshold (average plus the predetermined amount) for this example will be 140 μs. If the current sampled time measurement exceeds the "typical" on-hook time by the predetermined amount (e.g. is greater than 140 μs), the CPU assumes that a telephone set or the like is off-hook and using the PBX line.

If the charging interval measurement at the time when the data reporting device is ready to access the line indicates that the telephone line is being used by some primary piece of customer premises equipment, such as the associated subscriber's telephone set 22, the CPU does not initiate the call to the central computer. The CPU will wait for a fixed time interval and check again to determine if the subscriber's telephone is off-hook. If the current sampled time measurement does not exceed the "typical" on-hook time by the predetermined amount, the time sample indicates that the line voltage corresponds to an on-hook state. In this case, the CPU assumes that the telephone line is not currently in use and initiates the call to the central computer. An example of a 'CALL_ORIGINATE' routine using this procedure appears in FIG. 9.

Figure 9:
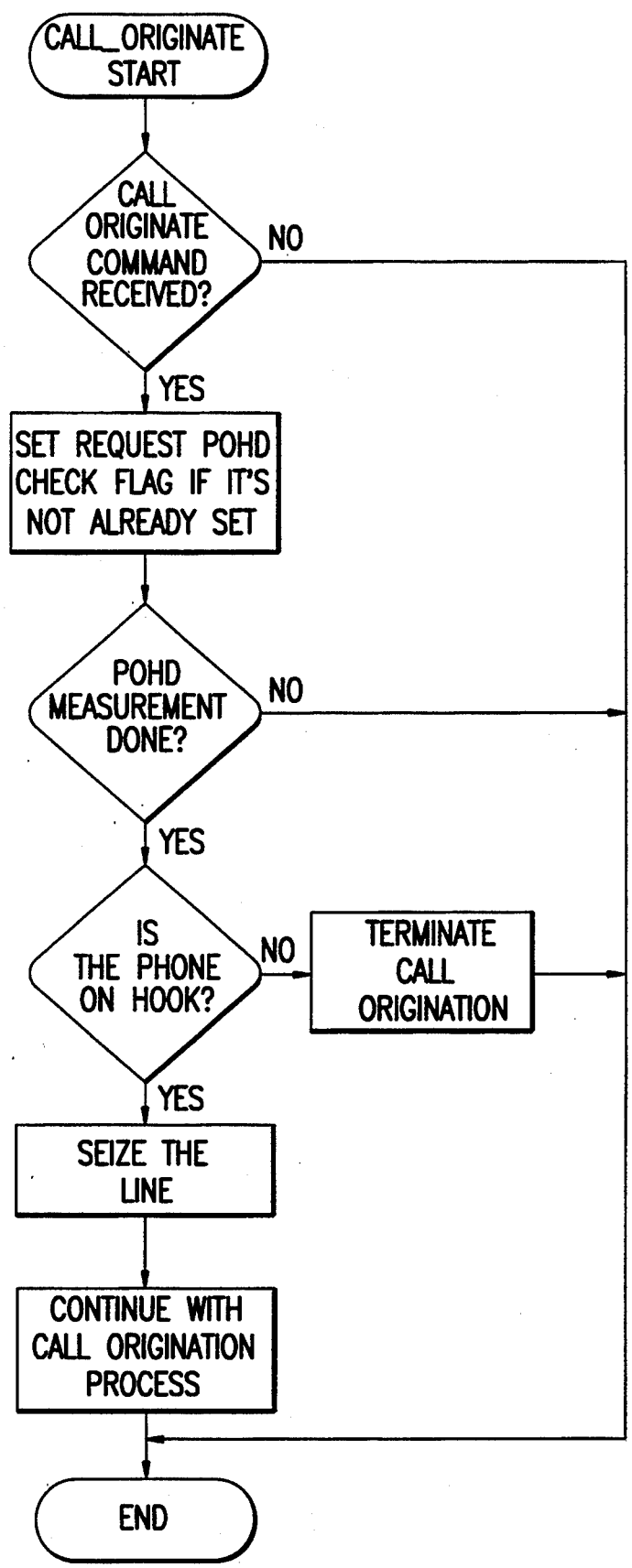

As shown in FIG. 9, when the call origination routine starts, the CPU checks to determine if an appropriate command has been received. If so, the CPU sets the flag to execute the POHD check routine described in more detail below. Then, if the POHD measurement is done, the CPU analyzes the results to determine if the primary equipment (e.g. the telephone) is on-hook. If the primary equipment is off-hook the CPU terminates the call origination procedure and the program ends. If the telephone is on-hook, however, the CPU provides a signal to the relay to seize the line by connecting the coupling transformer to the telephone line, and call origination continues until dialing is complete and data communication is established with the central computer.

Figure 6:
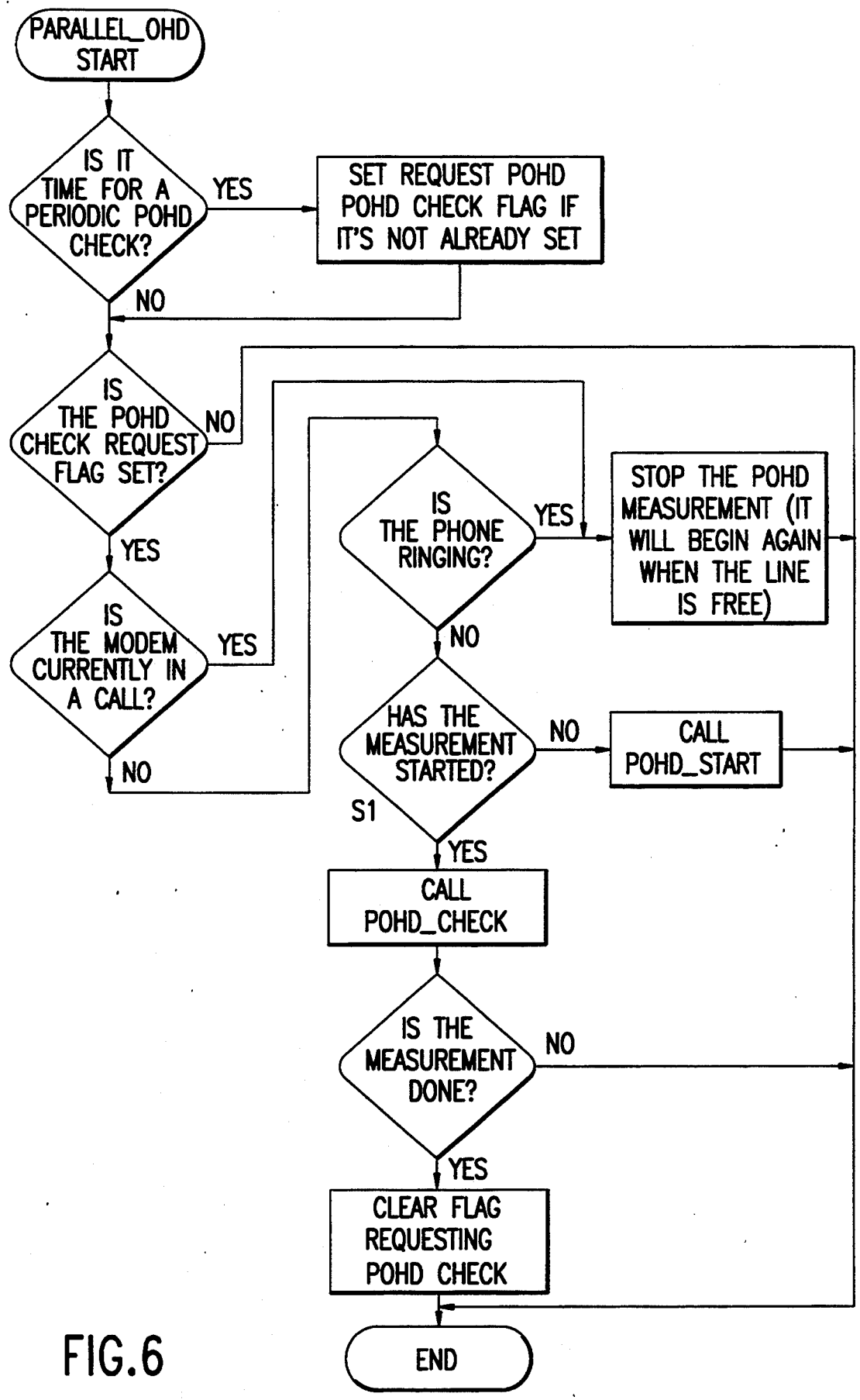
Figure 7A:
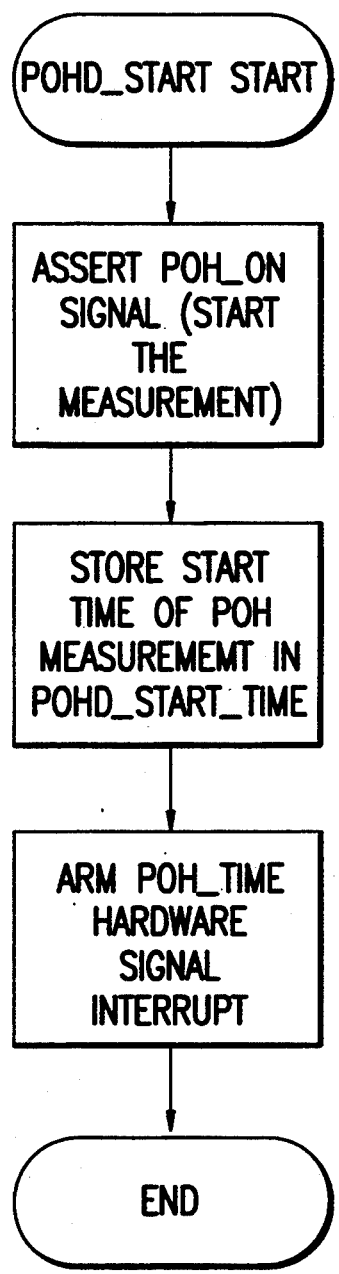
Figure 7B:
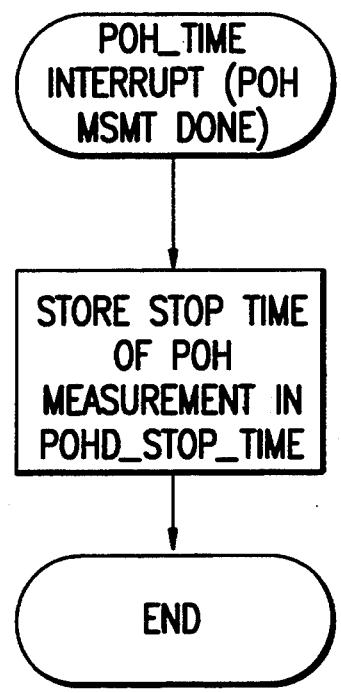
Figure 8:
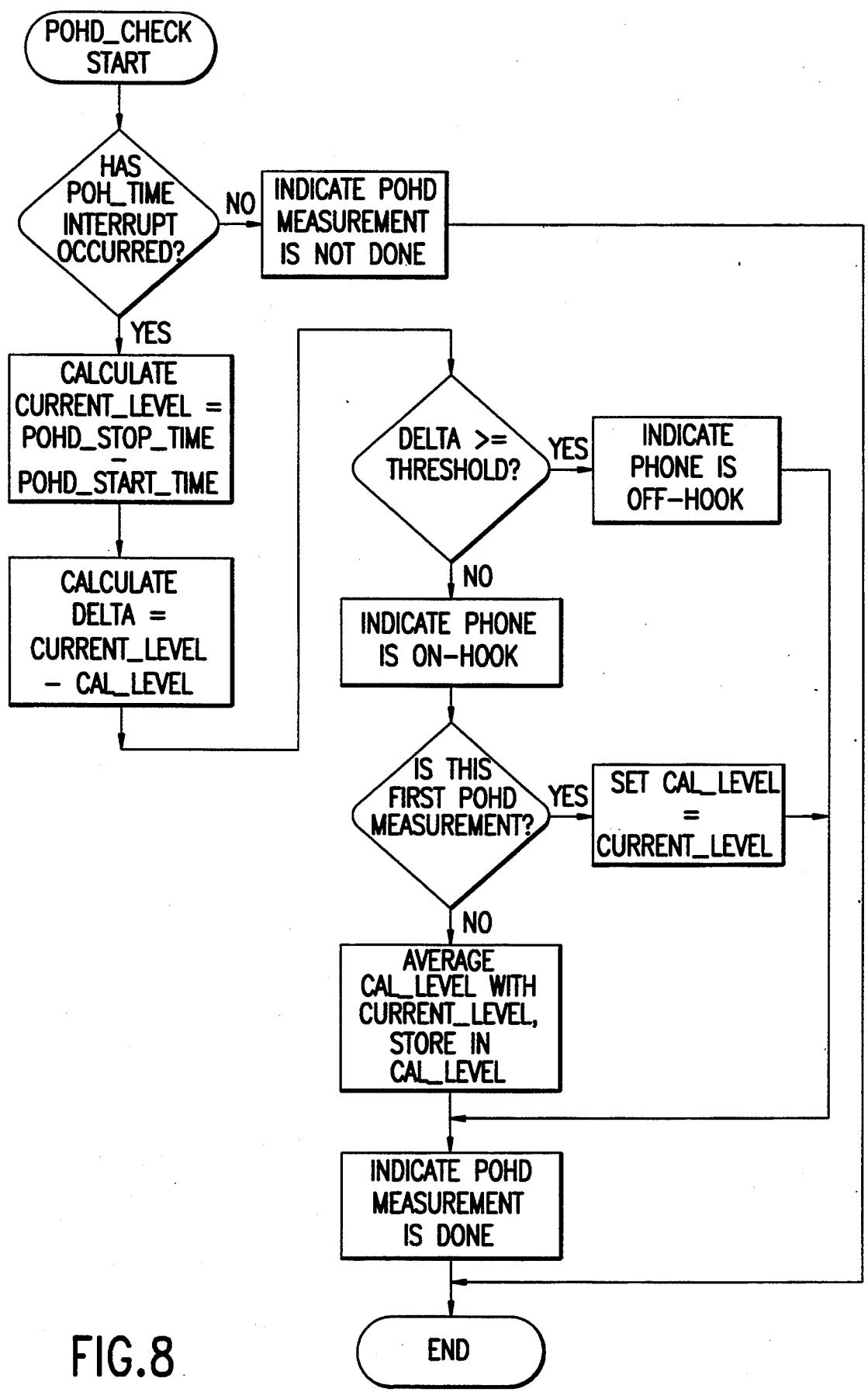

FIGS. 6 to 8 illustrate the processing routines of one actual example of the parallel off-hook (PARALLEL_OHD) or line availability determination in accord with the present invention. FIG. 6 provides an overview of the processing operations, and FIGS. 7A, 7B and 8 illustrate specific subroutines used in the process flow of FIG. 6.

Referring to FIG. 6, when the PARALLEL_OHD routine starts, the CPU checks to determine if it is time for a periodic measurement check of the charging interval. If so, the CPU sets a POHD check request flag. In the next processing step, if the POHD check flag is set, the CPU determines if the modem is currently using the line for a call to the central computer or if the telephone is ringing. If either of these two determinations is true, then the CPU stops the parallel off-hook measurement and waits until the line is free to begin again. If the modem is not using the line and the telephone is not ringing, processing flows to the determination at step S1 in FIG. 6. In this step, the CPU determines whether or not the measurement has already started.

If the charging interval measurement has not started, the CPU calls the subroutine POHD_START to begin the measurement. This subroutine, shown in FIGS. 7A and 7B, first causes the CPU to assert a POH_ON signal to initiate the actual measurement. This gates the opto-coupler U7 on to allow sampling of the telephone line voltage and charging of the capacitor C20, as discussed above. The CPU stores the start time in a register POHD_START_TIME. The CPU also arms an interrupt signal (POH_TIME) routine. The CPU then awaits for the interrupt (POH_TIME). The POH_TIME interrupt occurs when the PUT CR7 triggers, indicating that the voltage on the capacitor C20 exceeds the threshold. The CPU stores the time that the interrupt occurred in register POHD_STOP_TIME.

Returning to FIG. 6, if the determination at step S1 indicates that the charging interval measurement has started, the CPU calls the subroutine POHD_CHECK. This subroutine, shown in FIG. 8, performs the actual calculations summarized above. The CPU first determines if the POH_TIME interrupt has occurred. If not, the routine results in an indication that the measurement is not done yet. If this interrupt has occurred, the CPU proceeds to calculate the current voltage level as represented by the measured charging interval. Specifically, the CPU calculates

CURRENT_LEVEL = POHD_STOP TIME −

POHD_START_TIME.

Using the calculated level, the CPU next calculates the change or DELTA. Specifically,

DELTA=CURRENT_LEVEL−CAL_LEVEL where the value CAL_LEVEL is the average charging interval calculated during the last previous execution of the POHD_CHECK subroutine. The CPU next compares the interval change value DELTA to the threshold value. If the change in the charging interval is greater than or equal to the threshold (DELTA≧THRESHOLD), the routine results in an indication that the telephone is off-hook.

If the change in the charging interval is not greater than or equal to the threshold (DELTA≦THRESHOLD), the routine results in an indication that the telephone is on-hook. The CPU next checks to determine if this POHD_CHECK is the first measurement of the charging interval. If so, the CPU stores the currently measured charging interval (CURRENT_LEVEL) as the average value (CAL_LEVEL) for use in the next measurement. If this POHD_CHECK is not the first interval measurement, the CPU calculates a new average charging interval value using the currently measured charging interval CURRENT_LEVEL and stores the new average as the value CAL_LEVEL.

After storing an average value, an indication is produced that the POHD measurement is complete and the subroutine ends.

Returning to FIG. 6, after the POHD_CHECK subroutine, the CPU checks to determine if the particular execution of that subroutine indicated that the measurement was complete. If so the CPU clears the POHD check flag and the off-hook detection routine ends.

Figure 10:
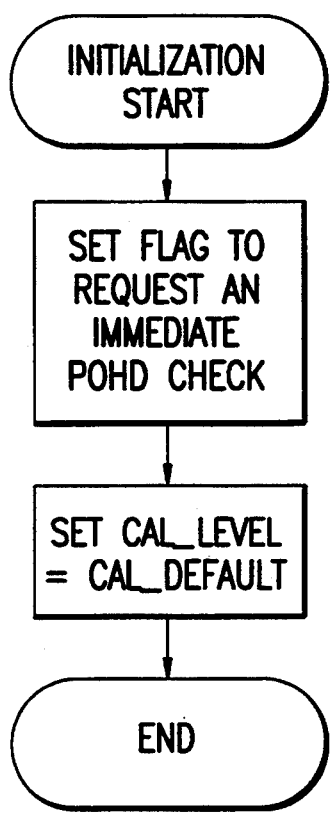

A special case exists when the data reporting device is first powered up and has not learned the characteristic of the telephone line. FIG. 10, shows the initialization routine. As shown, when the data reporting device first powers up, the CPU sets a flag to request an immediate parallel off-hook detection (POHD) check. For purposes of determining the change in the charging interval during this immediate parallel off-hook detection check, the CPU will use a default value (CAL_DEFAULT) for the previously calculated charging interval value (CAL-LEVEL). The CPU will use a time interval of approximately 140 μs as a threshold value. This interval essentially corresponds to a line voltage of 15 volts DC. If the measured charging interval is longer than 140 μs, the CPU assumes that the telephone set is off-hook; and if the measured charging interval is shorter than 140 μs, the CPU assumes that the telephone set is on-hook. If the CPU detects an off-hook in this manner, it will wait thirty minutes and take another reading. This procedure will be repeated until the line voltage exceeds 15 volts DC, indicating that the customer premises equipment has gone on-hook. When the detected interval first indicates that the line voltage exceeds 15 volts DC, the CPU stores the sampled charging interval value as the current average value for subsequent use in the above discussed averaging procedures.

The comparison of a currently measured time sample to an average time sample reduces false indication that the telephone is off-hook, which might otherwise be caused by transient signals on the line. This approach also allows the CPU to "learn" a time interval value corresponding to the on-hook voltage actually appearing on the particular line to which the data reporting device connects.

PICK-UP DETECTION

Figure 4:
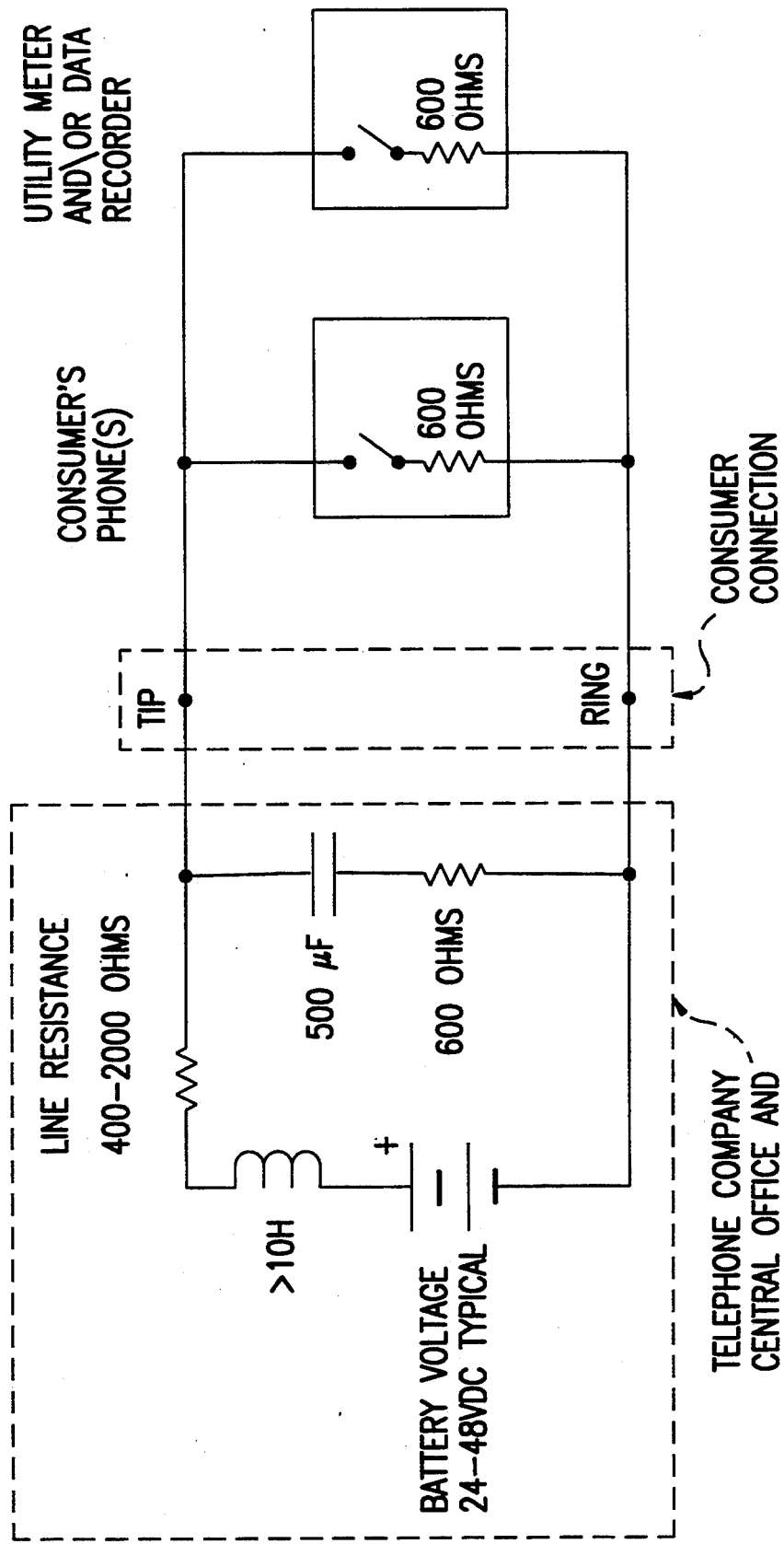
FIG. 4 is an equivalent circuit diagram showing the parallel connection of the data reporting device of FIG. 2 (incorporating the parallel off-hook detector of the present invention) and a subscriber's telephone to the line to a central office, for use in explaining the operation of the present invention.

The present invention recognizes pick-up during use of the line by the data reporting device by sensing changes in the impedance appearing across the subscriber premises end of the telephone line. The parallel off-hook type Pick-up Detector 26 works on the principle that the consumer line is in a high impedance state relative to the impedance of the telephone company central office. While the utility meter data reporting device is on-line communicating with the central computer, if the consumer picks up the handset of telephone set 22 or some other piece of customer premises equipment goes off-hook, a 600 Ohm impedance will appear across the line in parallel with that of the data reporting device (see FIG. 4). The Pick-up Detector 26 will sense this variation in impedance, even though the change in impedance may produce a relatively small variation in the line voltage.

With reference again to FIGS. 2, 3, 3A and 3B, the Pick-up Detector 26 comprises the circuit components U9, R29, R37, R38, CR5, C21, and C22. When the data reporting device is communicating over the telephone line, the line seizure relay 16 is activated. With particular reference to the circuit of FIGS. 3A and 3B, the relay shorts LOAD-1 to LOAD-2 to connect the lower side of the coupling transformer T1 through resistor R39 to the RING lead of telephone line 14. The bulk of the off-hook tip-ring DC current flows through R35, T1 and R39. A portion of the off-hook current also flows through resistor R38 and diode CR5 to charge capacitors C21 and C22. A short time after initially closing the relay to seize the line, the current will charge capacitors C21 and C22 to a steady-state condition essentially corresponding to the line voltage.

Subsequently if the subscriber picks up the handset of telephone set 22 or some other piece of customer premises equipment goes off-hook, a 600 Ohm impedance will appear across the line. This amounts to a substantially drop in the impedance at the subscriber end of the telephone line. When the impedance across the telephone line drops suddenly, the voltage on the capacitors C21 and C22 will momentarily be higher than the actual line voltage. The difference in the capacitor voltage and the line voltage will discharge through the opto-coupler U9 and the resistor R38. The opto-coupler U9 is set up to be relatively sensitive to small swings in voltage. Also, the resistance value of resistor R38 is chosen so that the excess voltage charged on capacitors C21 and C22 will discharge sufficiently slowly that it appears as a voltage change which is detectable by the sensitive opto-coupler U9. Consequently, the opto-coupler will output a pulse to the CPU indicating that a piece of customer premises equipment has attempted to seize the telephone line.

Figure 11:
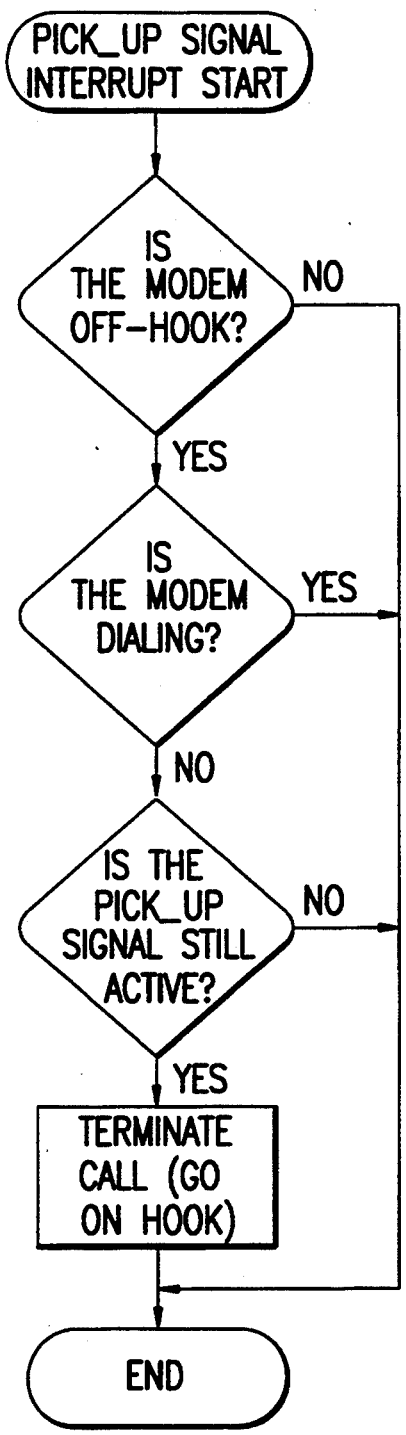
FIG. 11 is a flow chart depicting processing responsive to an interrupt signalling indicating a parallel pick-up of the primary equipment.

The CPU receives the pulse indicating a parallel pick-up by the primary communications equipment as an interrupt signal. As shown in the flow chart of FIG. 11, following the PICK_UP interrupt, the CPU determines if the modem is off-hook, which will be true during a data reporting call. Processing therefore flows to a determination of whether or not the modem is dialing out. Dialing operations may produce changes in line impedance, therefore the CPU will ignore impedance changes during dialing. If the modem is not currently dialing, then the modem is off-hook and the necessary dialing operations to call the central computer are complete. The CPU therefore checks to determine if the PICK_UP signal is still active, i.e., to determine if the change in impedance has persisted. If so, then the change in impedance represents a parallel pick-up or line seizure attempt by the primary equipment, therefore the PICK_UP signal provides a signal to open the line seizure relay and thereby place the secondary equipment on-hook, after which the routine ends.

To recapitulate, the present invention detects whether a telephone line is available by comparing a sampled time period for charging a capacitor in response to the line voltage to an average value. The invention also detects a drop in impedance during use of the line as an indication that a telephone or other customer premises equipment has attempted to seize the line. These detection results control operation of a line seizure means within a device, such as a data reporting device, which shares use of the line with other equipment. As a result, the device either will not seize the line or will relinquish access to the line to the telephone or other customer premises equipment.

The embodiment discussed in the above detailed description should be interpreted as an example of the invention only. The invention is subject to a variety of modifications which will be apparent to a person skilled in the relevant art. For example, the above description assumes that the secondary communication device reports utility meter data to a central computer station and/or receives program and control information. The invention can be used in other types of equipment, such as systems to accumulate data regarding television viewing habits. As, another example, the above discussion assumes that the data reporting device initiates calls to the central computer via the modem. Other procedures could be used to initiate data communication, such as by answering an incoming call at certain times or if the incoming call exhibits a special type of ringing signal. Alternatively, the secondary device may not be a data device. The present invention, for example, can be used in an answering machine which shares the line with a primary telephone set.

We claim:

1. A communication device for seizing a telephone line and communicating data over the telephone line, said communication device including an apparatus for detecting that a subscriber's telephone connected to the telephone line is off-hook at a time when the communication device is ready to seize the telephone line and for detecting if the telephone is taken off-hook during a time when the communication device has seized the telephone line, said apparatus comprising:
   (a) means for determining an average interval for charging a capacitor to a threshold voltage in response to an on-hook voltage appearing across the telephone line;
   (b) means for measuring an interval for charging the capacitor to the threshold voltage in response to a voltage appearing across the telephone line at the time when the communication device is ready to seize the telephone line;
   (c) means for recognizing that the telephone is off-hook and inhibiting line seizure by the communication device if the measured interval exceeds the average interval by more than a predetermined amount;
   (d) means for detecting a steady-state impedance across the telephone line when the communication device has seized the telephone line;
   (e) means for detecting a drop in impedance across the telephone line from the steady-state while the communication device has seized the telephone line and terminating seizure of the line by the communication device.

2. A communication device as in claim 1, said communication device further comprising:
   means for obtaining reading data from a utility meter; and
   means for transmitting the reading data over the telephone line.

3. In a device for communicating data over a telephone line wherein said device includes means for closing a loop of the telephone line to seize the line, an apparatus for detecting when customer premises equipment connected to the telephone line is off-hook at a time when the device for communicating data is ready to access the line and for detecting when the customer premises equipment goes off-hook during a time when the device for communicating data has seized the telephone line, said apparatus comprising:
   (a) a first capacitor;
   (b) a gate responsive to an activating signal for applying a voltage appearing across the telephone line to charge the first capacitor;
   (c) means for producing an indicating signal when voltage on the first capacitor exceeds a threshold value;
   (d) a central processing unit (CPU), said CPU periodically producing the activating signal and measuring an interval subsequent thereto until occurrence of an indicating signal to produce sample intervals, said CPU determining an average interval for charging the capacitor in response to on-hook voltage from the sample intervals, wherein when the device for communicating data is ready to access the line, said CPU produces the activating signal and measures a current interval subsequent thereto until occurrence of the indicating signal and recognizes that the customer premises equipment is off-hook if the measured current interval exceeds the average interval by more than a predetermined amount, said CPU inhibiting operation of the means for closing the loop of the telephone line in response to the recognition that the customer premises equipment is off-hook;
   (e) means for charging at least one second capacitor to a steady-state voltage in response to current flowing through the telephone line when the means for closing the loop has been activated to seize the telephone line; and
   (f) means for providing a signal to said CPU in response to a change from the steady-state voltage on the at least one second capacitor indicating that said customer premises equipment has entered an off-hook state, wherein in response to said signal said CPU deactivates the means for closing the loop to make the line available for use by the customer premises equipment.

4. An apparatus as in claim 3, wherein:
   the gate comprises a first opto-coupler which allows current from the telephone line to charge the first capacitor in response to the activating signal from the central processing unit; and
   the means for producing the indicating signal comprises a threshold detector responsive to the voltage on the first capacitor, and a second opto-coupler for producing the indicating signal in response to an output of the threshold detector.

5. An apparatus as in claim 4, wherein said threshold detector comprises a programmable unijunction transistor.

6. An apparatus as in claim 4, wherein said means for providing the signal comprises a third opto-coupler for producing an output pulse signal in response to the change in voltage on the at least one second capacitor.

7. A method for detecting at or near a subscriber's end of a telephone line whether or not customer premises equipment connected to the subscriber's end of the telephone line is off-hook when a device sharing the line is ready to access the telephone line, the method comprising the steps of:
   (a) determining an average interval for charging a capacitor to a threshold voltage in response to an on-hook voltage appearing across the telephone line;
   (b) measuring an interval for charging the capacitor to the threshold voltage in response to a voltage appearing across the telephone line at the time when the device sharing the line is ready to access the telephone line; and
   (c) recognizing that the customer premises equipment is in an off-hook state if the measured interval exceeds the average interval by more than a predetermined amount.

8. A method as in claim 7, wherein the customer premises equipment is a telephone set.

9. A method as in claim 8, wherein the device sharing the line is a device for reporting utility meter data over the telephone line.

10. A method as in claim 7, wherein the step of determining the average interval comprises:
periodically activating a gate to apply the voltage appearing across the telephone line to an RC circuit containing the capacitor, to charge the capacitor, and for each time that the gate is activated:
(1) measuring a sample interval for charging the capacitor to the threshold voltage;
(2) averaging the sample interval with a stored average value to determine a new average interval value for charging the capacitor in response to on-hook voltage; and
(3) replacing the stored average value with the new average interval value.

11. An apparatus for connection to a telephone line to detect whether or not customer premise equipment connected to the subscriber's end of the telephone line is off-hook when a device sharing the line is ready to access the telephone line, said apparatus comprising:
(a) a control means for producing an activating signal;
(b) a capacitor;
(c) a gate responsive to the activating signal for applying a voltage appearing across the telephone line to charge the capacitor; and
(d) means for producing an indicating signal when voltage on the capacitor exceeds a threshold value, wherein:
(1) said control means periodically produces the activating signal and measures an interval subsequent thereto to until occurrence of the indicating signal to produce sample intervals,
(2) said control means determines an average interval for charging the capacitor in response to on-hook voltage from the sample intervals,
(3) when the device sharing the line is ready to access the line, said control means produces the activating signal and measures a current interval subsequent thereto until occurrence of the indicating signal, and
(4) said control means recognizes that the customer premises equipment is off-hook if the measured current interval exceeds the average interval by more than a predetermined amount.

12. An apparatus as in claim 11, wherein the control means comprises a programmable central processing unit and associated ROM and RAM.

13. An apparatus as in claim 11, wherein:
the gate comprises a first opto-coupler which allows current from the telephone line to charge the capacitor in response to the activating signal from the control means; and
the means for producing the indicating signal comprises a threshold detector responsive to the voltage on the capacitor and a second opto-coupler responsive to an output of the threshold detector for producing the indicating signal.

14. An apparatus as in claim 13, wherein said threshold detector comprises a programmable unijunction transistor.

15. A method of sharing a subscriber is telephone line between a primary communication device and a secondary communication device, said method comprising the steps of:
(a) determining an average interval for charging a capacitor to a threshold voltage in response to an on-hook voltage appearing across the telephone line;
(b) measuring an interval for charging the capacitor to the threshold voltage in response to a voltage appearing across the telephone line at a time when the secondary communication device is ready to access the telephone line;
(c) recognizing that the primary communication device is in an off-hook state if the measured interval exceeds the average interval by more than a predetermined amount;
(d) allowing the secondary communication device to seize the telephone line if the measured interval does not exceed the average interval by more than the predetermined amount indicating the primary communication device is in an on-hook state;
(e) detecting a steady-state impedance across the telephone line while the line is seized by the secondary communication device;
(f) detecting a drop in impedance across the telephone line from the steady-state indicating that the primary communication device has attempted to seize the telephone line; and
(g) in response to the detection of the drop in impedance, releasing the line seizure by the secondary communication device.

* * * * *